Aug. 22, 1961 F. W. S. LOCKE, JR 2,997,260
RETRACTABLE HYDROFOIL LANDING GEAR FOR SUPERSONIC SEAPLANES
Filed Dec. 23, 1958 2 Sheets-Sheet 2

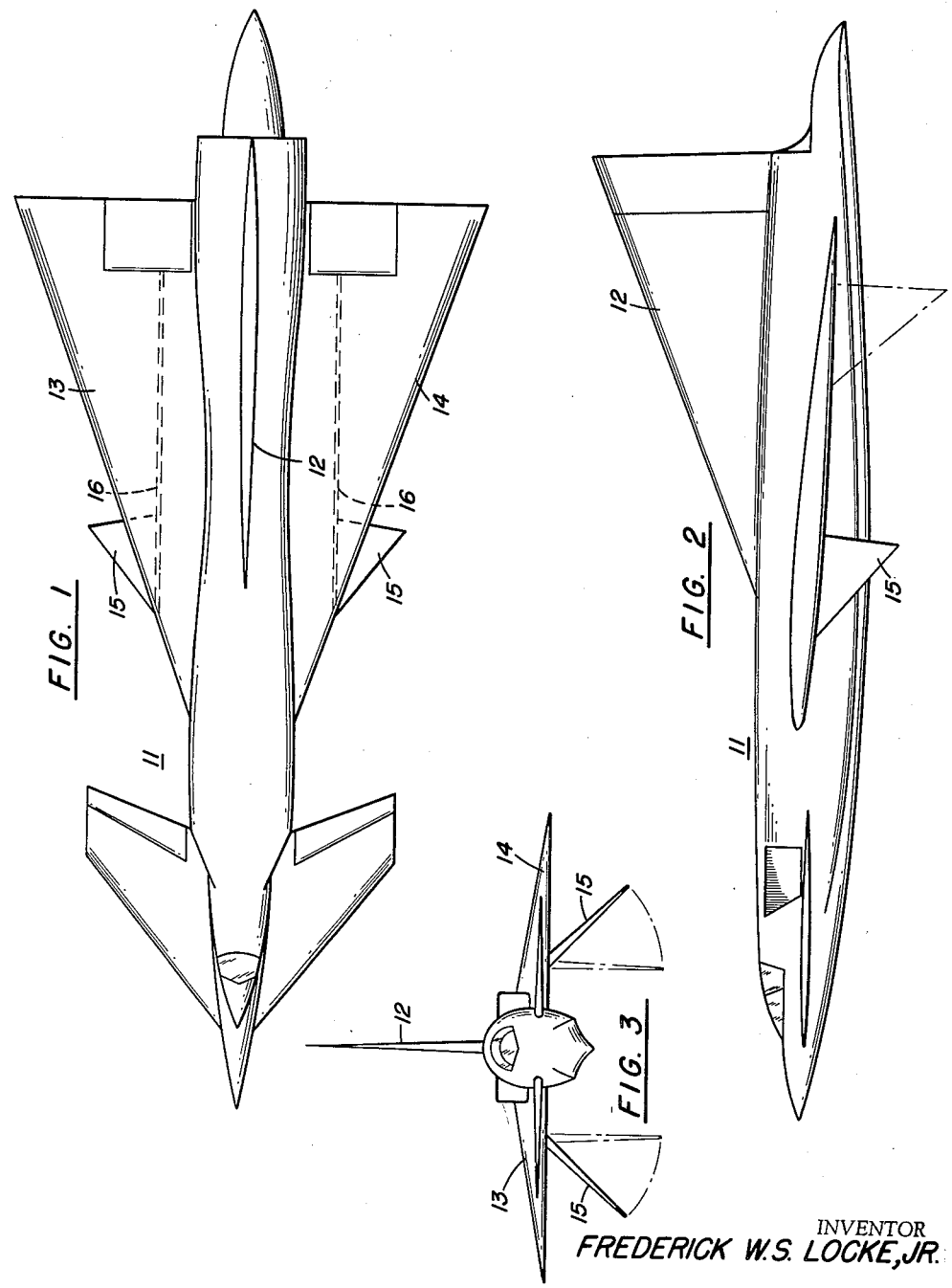

INVENTOR
FREDERICK W.S. LOCKE, JR.

BY R. J. Tompkins

ATTORNEY 2,997,260
RETRACTABLE HYDROFOIL LANDING GEAR
FOR SUPERSONIC SEAPLANES
Frederick W. S. Locke, Jr., Arlington, Va., assignor to the United States of America as represented by the Secretary of the Navy
Filed Dec. 23, 1958, Ser. No. 782,610
4 Claims. (Cl. 244—102)
(Granted under Title 35, U.S. Code (1952), sec. 266)

The invention described herein may be manufactured and used by or for the Government of the United States of America for governmental purposes without the payment of any royalties thereon or therefor.

The present invention relates to a retractable hydrofoil landing gear for supersonic seaplanes, and more particularly to a retractable hydrofoil landing gear for supersonic seaplanes which functions as aerodynamic fins during supersonic flight.

Conventionally, large hydrofoils are retracted during flight and become a portion of the surface of either the wings or the fuselage of the aircraft. This practice admits of many disadvantages in the design of the fuselage and wings, and in aerodynamic inefficiency. For example, the present practice requires cutouts in either the wings or fuselage of the plane, and since larger amounts of material than that removed to form the cutouts must be replaced in other areas of the aircraft, there is a serious weight consideration. Further, the present aircraft require a large aerodynamic fin since the hydrofoil is useless during flight.

In the present invention a hydrofoil landing fin is retracted to a position on the plane where it serves as an aerodynamic fin when the plane is in flight. Inasmuch as cutouts are not required to stow the hydrofoil, there is a considerable weigh reduction and many problems in fairing design are obviated. Further, there is a pronounced reduction in both the area and weight of the main fin because of the aerodynamic properties of the hydrofoil. Finally, the area of the main fin can be designed for subsonic flight during landing and take-off and the requirements for supersonic flight ignored since they will be supplied by the retracted hydrofoil.

Accordingly, it is an object of this invention to effect appreciable weight savings in supersonic seaplanes.

Another object is to obviate fairing problems involved in stowing a hydrofoil.

A further object is to provide a retractable hydrofoil which doubles as an aerodynamic fin.

A final object is to provide a retractable hydrofoil which serves as an aerodynamic fin in supersonic flight of a seaplane thereby effecting a weight and area reduction of the main fin.

Other objects and attendant advantages of the invention will become more fully apparent from the following description of the annexed drawings which illustrate a preferred embodiment and wherein:

FIG. 1 illustrates a top view of a supersonic seaplane equipped with the retractable hydrofoil.

FIG. 2 is a side view of the aircraft of FIG. 1 showing in dotted lines the hydrofoil in its aerodynamic position.

FIG. 3 is a front view of the seaplane of FIG. 2.

Figure 4:
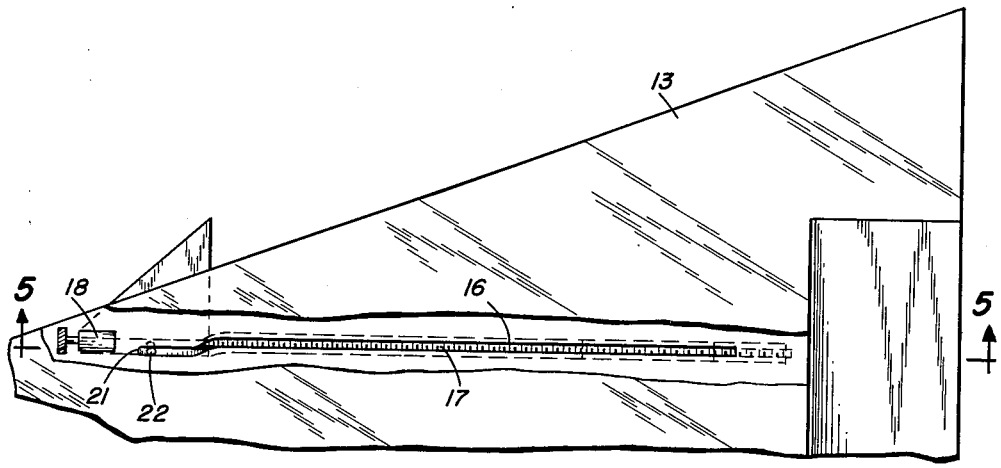
FIG. 4 illustrates an enlarged top view, partly in section, of a wing of the aircraft.

Referring to the drawings, there is shown a supersonic seaplane 11 having a main fin 12, main wings 13 and 14, and a retractable hydrofoil 15 slidably mounted on the undersurface of each wing. The hydrofoils move in the slots 16 from the landing position near the leading edges of the main wings in which they are in an outwardly angled position to a vertical position near the trailing edges of the wings, shown in dotted lines in FIGS. 2, 3, and 5, where they serve as aerodynamic fins.

Reference is made to FIGS. 4 through 7 which show in detail the mechanism for translating the hydrofoils between the fore and aft positions on the wings. A screw shaft 17 is mounted within and extends the full length of each wing slot 16, the screw shafts being rotatably journalled at each end and driven by reversible motors 18 which may be actuated by the pilot through any suitable mechanism. The screw shafts extend through threaded apertures 19 in the hydrofoils so that rotation of the shafts will cause the hydrofoils to move from one end of the shafts to the other.

Figure 5:
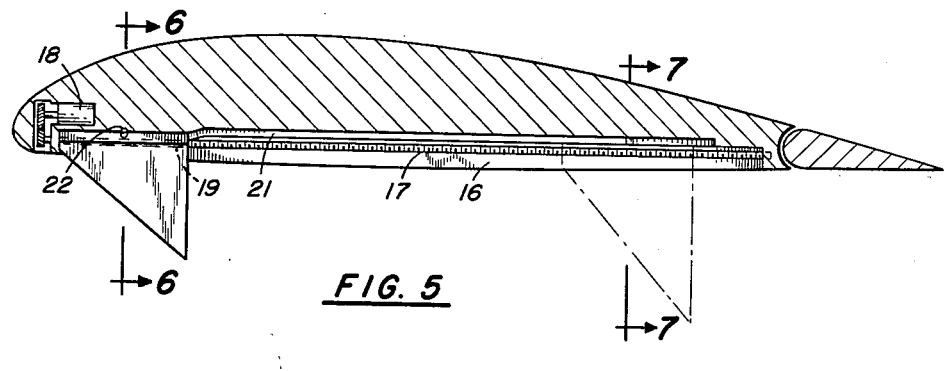
FIG. 5 is a view taken in the direction of the arrows 5—5 in FIG. 4.
Figure 6:
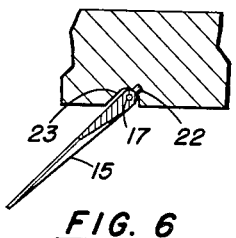
FIG. 6 is a view taken on the line 6—6 of FIG. 5.
Figure 7:
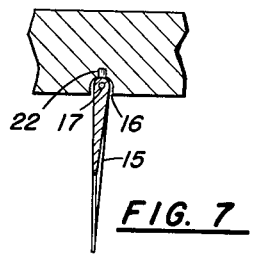
FIG. 7 is a view taken on the line 7—7 of FIG. 5.

In order to move the hydrofoils from an outwardly angled position to a vertical position where they serve as aerodynamic fins, a cam groove 21 has been cut in each slot 16. As shown in FIGS. 4, 5, and 7, the cam groove is at the top of the slot at its aft end and gradually curves around the slot so that the fore end is angularly displaced along the sidewall of the slot. Each hydrofoil has a cylindrical lug or cam 22 secured to its upper edge which is guided within the cam groove 21 so that as the hydrofoil is moved from the vertical aft position of FIG. 7 the lug will follow the cam groove and cause the hydrofoil to rotate to the angled or landing position of FIG. 6. As shown in FIG. 6 the slots 16 have their side walls enlarged at 23 near the leading edges of the wings so that the hydrofoils will be able to rotate the desired amount.

From the above it will be seen that retractable hydrofoils have been provided for a supersonic seaplane which are able to be moved in flight from outwardly angled positions near the leading edges of the wings where they serve as landing gear to vertical positions near the trailing edges of the wings where they function as aerodynamic fins. Since the hydrofoils are below the wings which is a region of strong pressure gradients in supersonic flight, and since any fin area in this region will be more effective than an equal fin area above the wings, the main fin 12 can be appreciably reduced in both weight and area. Moreover, the area of the main fin can be designed solely for subsonic flight during landings and take-offs since the requirements for supersonic flight will be supplied by the hydrofoils.

It is obvious that many modifications of the illustrated mechanism for moving the hydrofoils between fore and aft positions may be resorted to by those skilled in the art without departing from the spirit and scope of the invention as set forth in the appended claims.

What is claimed is:

1. In a supersonic seaplane having wings, a retractable hydrofoil slidably mounted on the undersurface of each wing which functions as landing gear and as an aerodynamic fin and means operatively connected to said hydrofoil for moving said hydrofoil rearwardly along the seaplane's longitudinal axis from a landing position near the leading edge of a wing of said seaplane to an aerodynamic fin position near the trailing edge of said wing whereby the seaplane's weight is distributed so that its aerodynamic efficiency is increased.

2. In a supersonic seaplane having main wings and a main fin, a hydrofoil slidably mounted on the undersurface of each wing, means for moving each hydrofoil from a landing position near the leading edge of the wings to an aerodynamic fin position near the trailing edge of the wings beneath the main fin and means for rotating the hydrofoils from an outwardly angled position in said landing position to a vertical position in said aerodynamic fin position.

3. The structure as claimed in claim 2 wherein said hydrofoils are slidably mounted in longitudinally extending slots in said wings, the fore end of each of said slots having an enlarged sidewall whereby the associated hydrofoil may be rotated into said angled position.

4. The structure as claimed in claim 3 in which said means for moving said hydrofoils comprises a threaded shaft rotatably mounted in each slot, means in each of said hydrofoils for engaging one of said shafts and means mounted within each wing for rotating a shaft whereby the associated hydrofoil will be moved from one end of the slot to the other.

References Cited in the file of this patent

UNITED STATES PATENTS

| | | |
|---|---|---|
| 811,743 | Reeve | Feb. 6, 1906 |
| 1,885,881 | Wolf | Nov. 1, 1932 |
| 1,906,018 | Sundling | Apr. 25, 1933 |
| 2,153,266 | Minshall et al. | Apr. 4, 1939 |
| 2,207,735 | Herb | July 16, 1940 |
| 2,936,137 | Kleminsky | May 10, 1960 |

FOREIGN PATENTS

| | | |
|---|---|---|
| 100,275 | Austria | Jan. 15, 1925 |
| 306,115 | Italy | Feb. 25, 1933 |
| 420,825 | Italy | May 6, 1947 |